Figure 1:
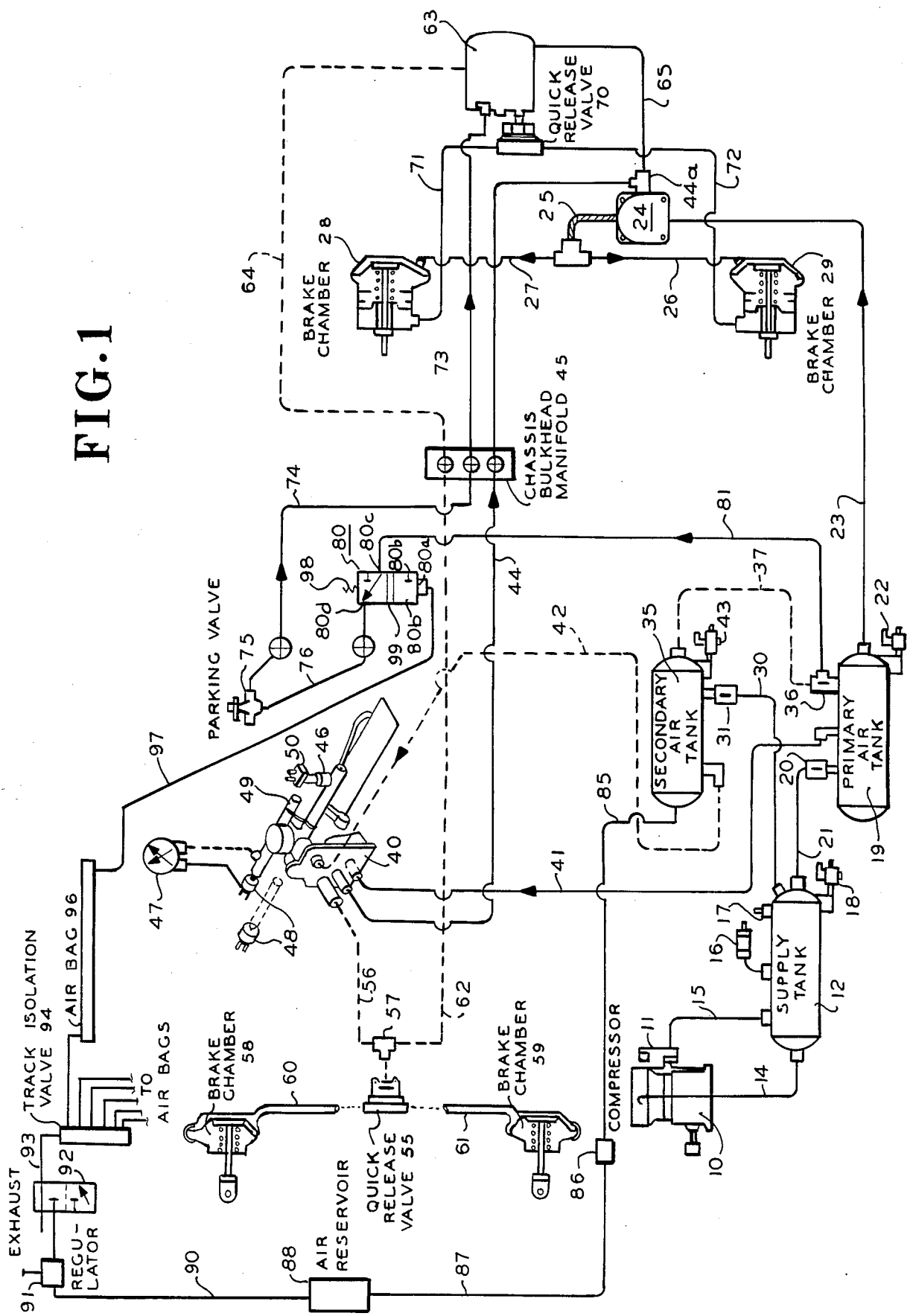

United States Patent [19]

Whiteman et al.

[11] Patent Number: 4,753,488
[45] Date of Patent: Jun. 28, 1988

[54] BRAKE LOCKOUT SYSTEM

[75] Inventors: Paul L. Whiteman, Morgantown; Donald N. Ulrich, Reamstown, both of Pa.

[73] Assignee: Morgan Corporation, Morgantown, Pa.

[21] Appl. No.: 44,518

[22] Filed: Apr. 30, 1987

Related U.S. Application Data

[63] Continuation-in-part of Ser. No. 872,175, Jun. 9, 1986, abandoned.

[51] Int. Cl.$^4$ .............................................. B60T 7/08
[52] U.S. Cl. .................................... 303/18; 198/306; 303/1
[58] Field of Search ................ 180/271, 290; 188/110, 188/177, 178; 198/306; 303/1, 8, 18, 28, 71, 75, 80

[56] References Cited

U.S. PATENT DOCUMENTS

| 2,724,462 | 11/1955 | Henley | 188/110 |
| 3,067,858 | 12/1962 | Loosli | 198/126 |
| 4,074,787 | 2/1978 | Cunningham et al. | 303/18 X |
| 4,076,326 | 2/1978 | D'Angelo | 303/18 |

Primary Examiner—Duane A. Reger
Attorney, Agent, or Firm—Elliot M. Olstein; Raymond J. Lillie

[57] ABSTRACT

A brake lockout system is provided for use in conjunction with the air brake systems of heavy vehicles, such as trucks that are equipped with other air operated equipment to prevent release of a parking brake unless the air operated equipment is in a disengaged condition.

7 Claims, 2 Drawing Sheets

BRAKE LOCKOUT SYSTEM

This application is a continuation in part of application Ser. No. 872,175, filed June 9, 1986, now abandoned.

This invention relates to a brake lockout system for use with air operated equipment of the type that include a valve to prevent brake release for vehicle operation unless the conveyor system is in a disengaged condition.

Air brake systems are in wide use in heavy vehicles, and considerable development work has been performed to provide various types of air brake systems that operate either manually or automatically to apply the vehicle's brakes should the reservoir air pressure go below safe limits, or should other considerations require that the brakes be actuated other than in the normal manner.

Examples of prior art patents relating to such systems are R. H. George U.S. Pat. Nos. 2,930,658 and 3,271,084.

The use of air operated loading and unloading conveyor systems for movement of freight into and out of trucks has become widespread due to the advantages of being able to easily and quickly move freight items, and then to retract the conveyor assembly out of the way for vehicle movement. Most of these conveyor systems are installed in straight trucks, i.e., those not having a separate trailer. Although most of these conveyor systems are installed in straight trucks, these conveyor systems may be installed in separate trailers as well. An example of such a conveyor system is the Hydraroll Roller Track System available from Morgan Corporation, Morgantown, Pa.

The Hydraroll Roller Track System includes a plurality of rollers, carried in a frame that extends lengthwise in the truck bed, and which has a channel carried in the bed to accommodate the frame. The channel has an air bag in it, between it and the frame, which is supplied with air under pressure to inflate the air bag, and thereby raise the frame so that the rollers and frame are above the bed of the truck and available for cargo to be moved on and off the rollers, and in and out of the truck. When the cargo has been unloaded, or loaded, the air bag is deflated and the frame and roller retract down in the channel, and below the surface of the truck bed to an out of contact disengaged position.

While the Hydraroll system is usually provided with a cargo stop assembly, which can be a part of the roller track assembly or can be separate, the stops are useful only when the track is in the disengaged position.

When installed in most straight trucks, such as the Ford F-700 and F-800 series, the Hydraroll Roller Track System uses air supplied from the truck's air tank to operate and inflate the air bags. The energization and de-energization of the Hydraroll Roller Track System is accomplished by the operator moving a hand valve located at the roadside rear of the truck chassis, and which is often enclosed in a lockable metal box. Unfortunately, at times the operator may forget to de-energize the air bags before driving away, with the result that the cargo can exit the vehicle resulting in damage to the vehicle, the cargo, and otherwise. The brake lockout system of the invention prevents the vehicle from being moved unless the Hydraroll system is in a de-energized condition with the rollers and frame below the surface of the truck bed, and thereby provides for safe transportation of the cargo.

This problem may be encountered with other air operated equipment as well, such as air operated scales, winches, and lumber rollers.

This invention relates to an improvement in an air operated parking brake system and air operated equipment system for a vehicle. The improvement comprises means for providing air to said air operated brake system and said air operated equipment system, said air operated brake system releasing the parking brake when supplied with air, valve means for controlling air flow to the air operated brake system, said valve means having an open position by which air may flow to said parking brake so as to release said parking brake, and a closed position to prevent release, and means placing the valve means in air flow communication with the air operated equipment system to maintain the valve means in a closed position when the air operated equipment system is in an operative condition to prevent thereby release of the parking brake. The valve means may comprise a valve, and a spring attached to said valve. The valve moves to the closed position when the air operated equipment is in an operative condition in that air from the air operated equipment enters said valve, thereby compressing said spring. The valve moves to the open position when air is released from said air operated equipment in that release of air from the air operated equipment also releases the air which maintains the valve in the closed position, thereby relaxing said spring. The opening of the valve provides air to said air operated brake system. The air operated equipment system may be the Hydraroll system described above, an air operated scale, an air operated winch, or air operated lumber rollers, etc.

Figure 2:
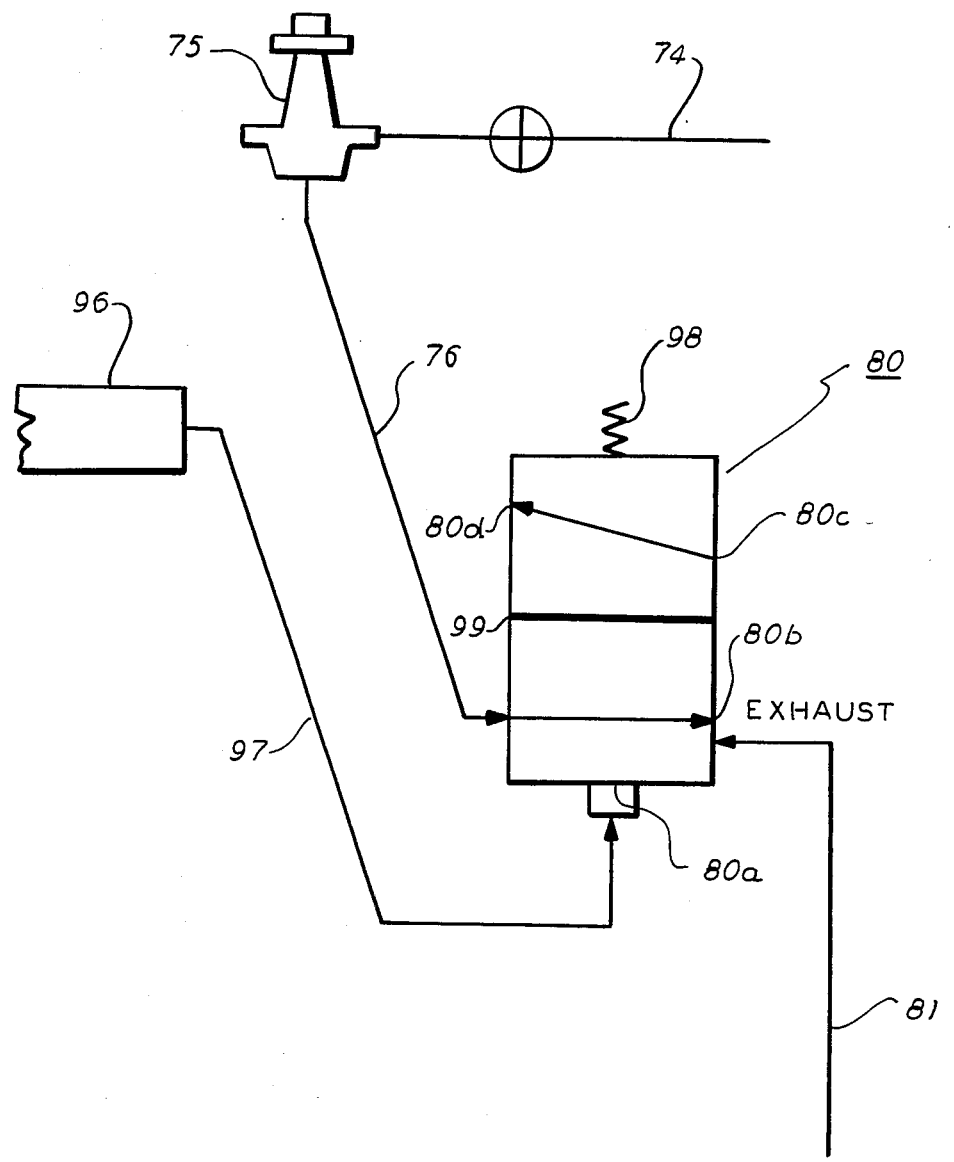

The nature and characteristic features of the invention will be more readily understood from the following description taken in connection with the accompanying drawings forming part hereof in which:

FIG. 1 is a schematic view of a typical motor vehicle air brake system, which incorporates the lockout system of the invention, and wherein the valve means is in an open position; and FIG. 2 is a drawing of the valve means in a closed position.

It should, of course, be understood that the description and drawing herein are illustrative merely and that various modifications and changes can be made in the structure disclosed without departing from the spirit of the invention.

Referring now more particularly to the drawings, a typical air brake system is therein illustrated, of the type used in the Ford F-700 and F-800 truck series.

The air brake system includes a compressor 10 for providing pressurized air and which has a governor 11 thereon, which compressor and governor are respectively connected to an air supply tank 12, by pipes 14 and 15. The tank 12 has a safety valve 16 thereon, a tank valve 17, a drain cock 18, and is connected to a primary air tank 19 through check valve 20 and pipe 21. The primary air tank 19 is provided with a drain cock 22, which valve is connected by pipes 25, 26 and 27 to rear brake chambers 28 and 29.

The supply tank 12 is connected by a pipe 30 to check valve 31 and to secondary air tank 35. The primary air tank 19 is also connected to secondary air tank 35, through double check valve 36 and pipe 37. The primary air tank 19 is connected to a master cylinder 40 by pipe 41, and the secondary air tank 35 is also connected to cylinder 40, but by a pipe 42. The secondary air tank is also provided with a drain cock 43.

The master cylinder 40 is connected to the relay valve 24 by a pipe 44 through a chassis bulkhead module 45, and tee 44A, and is provided with a double check valve 46, dual air gauges 47, low pressure indicators 48, horn 49, and stoplight switch 50, all of well known type and known in the prior art.

The master cylinder 40 is connected to a quick release valve 55 by pipe 56 and tee 57 which valve 55 is connected to front brake chambers 58 and 59 by pipes 60 and 61. The tee 57 is connected by pipe 62 to manifold 45 and then to an inverting relay valve 63 by pipe 64. The inverting relay valve 63 is connected to relay valve 24 by pipe 65 through tee 44A. The inverting relay valve 63 has a quick release valve 70 connected thereto, which valve 70 is connected to rear brake chambers 28 and 29 by pipes 71 and 72. The inverting relay valve 63 is connected by pipe 73 to chassis bulkhead manifold 45, and by pipe 74 to parking valve 75. Parking valve 75 is connected by pipe 76 to a three-way two position lockout control valve 80. Valve 80 has a pilot port 80a to receive air from air operated equipment such as air bags 96, an exhaust port 80b that exhausts air from parking valve 75 when valve 80 is in the closed position, port 80c which receives air from pipe 81, and port 80d through which the air from pipe 81 exits valve 80 and is passed through pipe 76, parking valve 75, and ultimately to brakes 28 and 29 in order to release brakes 28 and 29. Valve 80 includes a spring loaded movable member 99 which is positioned in a valve casing (not shown). The movable member 99 is normally in a position by which it places ports 80c and 80d in communication with lines 81 and 76, respectively. This is known as the open position of valve 80. The movable member 99 may be moved to a closed position, which, as hereinafter described, is caused by the entry of compressed air from air operated equipment such as air bags 96, into pilot port 80a. In FIG. 1, the valve is in an open position, and FIG. 2 schematically illustrates the closed position for valve 80.

The secondary air tank 35 has a conveyor system air supply pipe 85 connected thereto, and is also connected to a pressure protector and check valve 86, which has a pipe 87 connected thereto, and to an air reservoir tank 88 for the air operated equipment which can be the Hydraroll Roller Track System offered by Morgan Corporation, Morgantown, Pa.

The valve 86 is designed so that air will not flow past the valve until the pressure in the secondary tank is at a safe required pressure. The tank 88 has an outlet pipe 90 connected thereto and is also connected to a pressure regulator, which for the Hydraroll system is set at 30 psig, and which has a pipe 91 connected to it and to a conveyor operator valve 92.

The conveyor operator valve 92 has a pipe 93 connected to it, and to a track isolation valve 94, which has pipes 95 connected thereto, and to air bags 96, a typical one being illustrated, which has a pipe 97 connected to it and to the three-way lockout valve 80. In an alternative embodiment, pipe 97 is connected to lockout valve 80 and to conveyor operator valve 92, and bypasses air bags 96.

The conveyor operator valve 92 supplies air under pressure to the air bags 96 in one position, for inflation and lifting of the roller track (not shown) for cargo (not shown) engagement, and for loading and unloading of cargo from a vehicle (not shown). The valve 92 in the second position permits air to flow from the air bags 96 for exhaust, and the roller tracks (not shown) to retract into the channel and become disengaged from the cargo, so that safe vehicle movement may then occur.

The mode of operation will now be pointed out.

Assuming that the vehicle (not shown) has arrived at a location for loading or unloading of cargo, the operator would set the parking brake in conventional manner and would then operate conveyor valve 92 to inflate the air bags 96 and raise the roller track for cargo engagement. When the loading or unloading of cargo is completed, the operator is supposed to manipulate valve 92 to permit the air in air bags 96 to flow back through pipe 93, and exhaust out through valve 92, thereby causing the roller track to retract into the channel (not shown) to a cargo disengaged position, for safe vehicle operation. Should the operator not manipulate valve 92, the air bags 96 would still be in the cargo engaged position and cause a dangerous condition if cargo is on the raised roller track.

In order for the operator to move his vehicle, he must operate the parking valve 75, to operate the inverting relay valve 63 to cause air to be released from the rear brake chambers 28 and 29, and the brakes to be released.

However, in the closed position for normal air operated equipment operation, valve 80 will not allow air to pass from pipe 81 to the parking valve 75 for the brake release, because there is still compressed air under pressure coming from the air bags 96, or alternatively, from valve 92 through pipe 97 to the pilot port 80a of lockout control valve 80. When the air pressure in the pilot port 80a reaches 15 psig or greater, valve 80 rises and compresses spring 98, thereby blocking air from pipe 81 from entering valve 80, through port 80c. Any air from parking valve 75 and pipe 76 is exhausted through exhaust port 80b of valve 80, thereby depressurizing parking valve 75. Therefore, no air is supplied by pipe 81 to parking valve 75, and also to relay 63 and rear brakes 28 and 29. Because no air is supplied to the brakes 28 and 29, the brakes 28 and 29 cannot be released and the vehicle remains immobilized. In order to release the brakes 28 and 29, one manually positions valve 92 so as to exhaust the air contained in air bags 96 and pipe 97. The air contained in the pilot portion of valve 80 exits valve 80 through pilot port 80a, pipe 97, air bags 96, pipe 93 and leaves the system through valve 92. Once the air has exited valve 80, spring 98 is relaxed and air from pipe 81 is able to enter port 80c of valve 80, exit valve 80 through port 80d and pass through pipe 76, parking valve 75, relay valve 63, and enter rear brakes 28 and 29 in order to release the brakes 28 and 29 so that the vehicle may be moved.

Although the brake lockout system is described in connection with the Hydraroll system, other air operated equipment systems such as an air operated scale, an air operated winch, or air operated lumber rollers may be used.

It is to be understood that the system of the present invention is not to be limited to the specific embodiment described above. The invention may be practiced other than as particularly described and still be within the scope of the accompanying claims.

What is claimed is:

1. In a vehicle including an air operated parking brake system and air operated equipment system, the improvement comprising:

means for providing air to said air operated parking brake system and said air operated equipment system, said air operated brake system releasing a parking brake when supplied with air;

valve means for controlling air flow to the air operated parking brake system, said valve means including an open position to provide air to the air operated parking brake system to release a parking brake, and a closed position to prevent air flow to said parking brake thereby preventing release of a parking brake; and means placing the valve means in air flow communication with the air operated equipment system to provide air from the air operated equipment system when the air operated equipment system is in an operative condition, thereby maintaining the valve means in a closed position to prevent release of the parking brake.

2. The system of claim 1 wherein said valve means receives compressed air from said air operated equipment system when said valve means is in a closed position.

3. The system of claim 2 wherein said compressed air is at a pressure of at least 15 psig.

4. The system of claim 1 wherein said valve means comprises:

a valve; and a spring attached to said valve, whereby said valve moves to said closed position by means of air from said air operated equipment in an operative condition entering said valve and thereby compressing said spring and said valve moves to said open position by means of air from said air operated equipment exiting said valve and thereby relaxing said spring, thereby providing air to said air operated brake system.

5. The system of claim 3 wherein said compressed air is at a pressure of about 30 psig.

6. A brake system for a vehicle, comprising:

an air brake;

an air operated equipment system;

a valve means for controlling air flow from an air source to the air brake; and means placing the valve means in air flow communication with air from the air operated equipment system, said valve means being movable between a closed position and an open position by provision and release, respectively, of air from the air operated equipment system, thereby preventing air flow from an air source to said air brake and preventing release of said air brake when air is provided to the air operated equipment system and permitting air flow from an air source to said air brake to permit release of said air brake when air is released from the air operated equipment system.

7. A method of controlling air flow to an air brake from an air source in a vehicle including an air brake operated by air from an air source, valve means for controlling air flow from an air source to the air brake, and an air operated equipment system, comprising:

closing said valve means by air provided to said air equipment system to prevent release of said air brake when air is provided to the air operated equipment system; and opening said valve by release of air from the air operated equipment system whereby said air brake may be released by air from an air source.

* * * * *